Oct. 2, 1962 W. H. FISHER 3,056,162
APPARATUS FOR POLISHING WET PELLETED CARBON BLACK
Filed Feb. 2, 1959
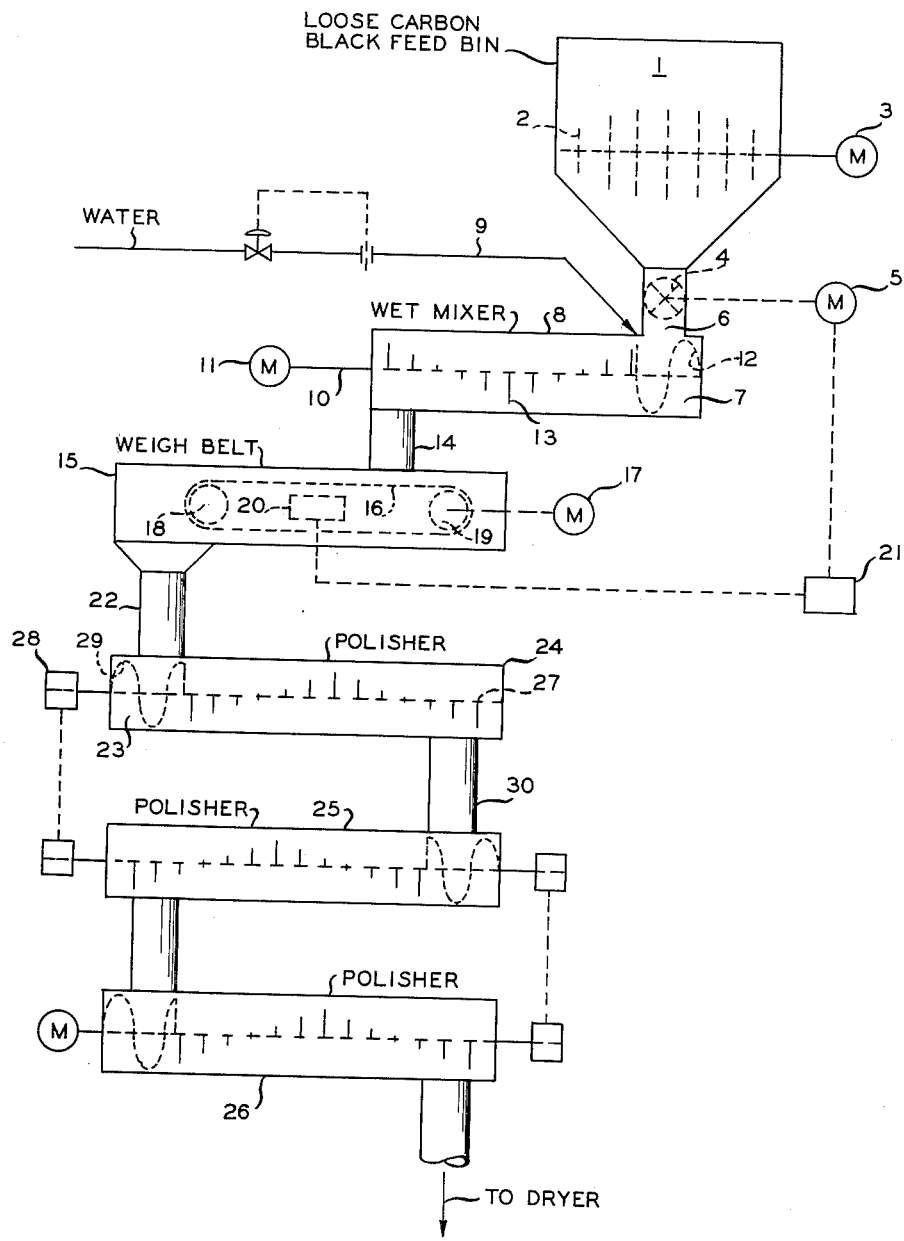
INVENTOR.
W. H. FISHER
BY
Hudson & Young
ATTORNEYS

United States Patent Office 3,056,162
Patented Oct. 2, 1962

3,056,162
APPARATUS FOR POLISHING WET PELLETED CARBON BLACK
Waldo H. Fisher, Borger, Tex., assignor to Phillips Petroleum Company, a corporation of Delaware
Filed Feb. 2, 1959, Ser. No. 790,749
3 Claims. (Cl. 18—1)

This invention relates to the pelleting of carbon black. In one of its aspects, the invention relates to the polishing of loose, wet pellets of carbon black by downwardly feeding the wet pellets into one end of an elongated polishing zone and at said end of said zone, positively forcing the pellets into and through said zone. In a further aspect of the invention, it relates to the wet mixing of loose carbon black with water by feeding the black and water into one end of an elongated wet mixing zone and therein mixing and positively forcing the admixture towards the other end of said zone. In another of its aspects, the invention relates to apparatus comprising essentially a substantially horizontally disposed polisher having extending axially throughout a rotatable shaft equipped with tines or equivalent polishing means, the end of the shaft at the feed end of the apparatus being equipped with a continuous flight or auger-shaped means to positively impel the pellets into and through the apparatus. In still another aspect of the invention, it relates to an apparatus for wet mixing of loose carbon black and water comprising essentially a substantially horizontally disposed mixing vessel having axially extending therethrough a rotatable shaft equipped with mixing elements, the end of the shaft at a feed end of the apparatus being equipped with a continuous flight or auger-shaped means to positively impel the mixture in the vessel at the feed point thereof towards the mixing elements and through the vessel and means for feeding loose carbon black and water to the feed end of said apparatus. In another of its aspects, the invention relates to a cascade arrangement of several carbon black polisher apparatus units, as described herein, each of the units being substantially horizontally disposed, each being equipped with an axially disposed rotatable shaft, each shaft being equipped with polishing means and at the receiving end of the polishers, each shaft being equipped with an auger-shaped or equivalent positive pellet-impelling means, the inlet end of each successive polisher being positioned below the outlet end of each preceding polisher.

In a specific embodiment of the invention, there is provided a method of pelleting carbon black which comprises passing water and loose carbon black to one end of an elongated wet mixing zone and at said end of said zone mixing and positively forcing the mixture toward the other end of said zone, discharging the wet carbon black mixture into a wet carbon black amount measuring zone in which the amount of carbon black is measured, discharging a measured amount of carbon black from said measuring zone to one end of an elongated polishing zone, compressing said wet carbon black with a positive force into said one end of said zone and toward its other end, in said zone polishing the wet carbon black, removing polished carbon black pellets from said zone, and controlling the amount of carbon black fed to said elongated wet mixing zone responsive to the amount of carbon black being measured in said measuring zone. In a further specific embodiment of the invention, the apparatus comprises a wet mixing means for mixing loose carbon black and water, means for feeding loose carbon black and water to one end of said mixing means, an axially disposed substantially horizontal rotatable shaft in said mixing means, said shaft at a feed end of said means being equipped with means for positively conveying into and through said mixing means an admixture of loose, wetted carbon black formed at said end, said shaft also comprising mixing elements along a substantial portion of the remainder thereof, wet carbon black mixture measuring means, means for passing wet carbon black from said mixing means to said measuring means, means upon said carbon black feeding means upon said mixing means adapted to control the flow of loose carbon black into said mixing means, means upon said carbon black measuring means adapted to control said means upon said loose carbon black feeding means to control the rate of flow of loose carbon black into said mixing means responsive to the amount of carbon black in said carbon black measuring means, means for discharging carbon black from said measured means into means suited to the pelleting of carbon black comprising horizontally disposed carbon black polishing means, means for conveying loose, wet pellets to an end of said polishing means, and means at said end of said polishing means to positively force the loose, wet pellets into said end of said polishing means in a direction toward the other end of said polishing means.

In the pug milling or polishing of wet pelleted carbon black, it is known to pass the wet pellets through a polisher which essentially is an elongated vessel in which there rotates a shaft equipped with tines or similar or equivalent elements. These elements stir the carbon black and serve to compress and to rub the particles together. Also, in admixing loose, substantially dry carbon black with water, it is known to feed the carbon black and water to one end of a so-called wet mixer vessel. The wet mixer is usually horizontally disposed and there is difficulty in causing the wetted carbon black to pass through the wet mixer. Further, feeding loose, wet pellets into the feed end of the polisher, it has been observed that the wet pellets tend to build up in the inlet or to bridge and plug the same. I have now conceived that by removing the tines or other elements from the forward or feed ends of the shafts in the wet mixer and/or in the polisher and replacing the same with auger-shaped elements or flight conveyor elements or equivalent, that the loose, wet carbon black or carbon black pellets are positively conveyed into and through the wet mixer and/or polisher. Furthermore, where several vessels are arranged in tendem and cascade fashion by placing the inlet end of each succeeding vessel below the outlet end of each preceding vessel and similarly equipping the inlet end of the shaft in each of the vessels with an auger-shaped element, as described, continuous operation can be effected without any stoppage due to bridging or build-up of the wet carbon black or the wet carbon black pellets in the transfer conduits.

An object of this invention is to provide a method for pelleting carbon black. A further object of this invention is to provide a method for wet mixing loose carbon black and water. Another object of the invention is to provide a method for pelleting and/or polishing wet pelleted carbon black. A further object of the invention is to provide an apparatus for pelleting carbon black. Still another object of the invention is to provide an apparatus for admixing loose carbon black and water. A still further object of the invention is to provide an apparatus for polishing wet pelleted carbon black in which apparatus the black to be polished or being polished is made to move positively into a polishing zone or section in which it is to be polished. Yet another object of this invention is to provide an apparatus for admixing loose carbon black and water in which apparatus the black to be mixed with water is made to move positively into a mixing zone or section in which the black is to be thoroughly admixed with water.

Other aspects, objects and the several advantages of the invention are apparent from a study of this disclosure, the drawing and the claims.

Referring now to the drawing, 1 is a loose carbon black feed bin equipped with agitator 2 actuated by motor 3. A star valve or equivalent 4 actuated by a motor 5 feeds loose carbon black through transfer conduit 6 into end 7 of a wet mixer 8. Water is admitted to end 7 by way of flow controlled pipe 9. Mixer 8 is equipped with rotatable shaft 10 actuated by motor 11. Shaft 10 is equipped for a substantial length thereof below the entry of the loose carbon black into end 7 of mixer 8 with an auger or conveyor flight 12 which positively conveys the mixture of water and loose, wet carbon black into the remainder of mixer 8. Mixing elements 13 are provided on shaft 10. Wet mixed carbon black drops by way of transfer conduit 14 into wet carbon black amount measuring section 15 and in said section 15 onto motor-driven belt 16 driven by motor 17 and endlessly passing over rolls 18 and 19. The weight of wet carbon black on belt 16 is detected by element 20 and a signal conveyed by way of control box 21 to motor 5 thus operating star valve 4 responsive to the weight of wet carbon black passing over belt 16. Thus, a carefully controlled amount of wet mixed carbon black is passed through mixer 8, section 15 and from section 15 by way of transfer conduit 22 into end 23 of polisher 24. Since in the drawing there are shown a series of three polishers arranged in cascade fashion which are substantially similar in construction and operation, only polisher 24 will be described, it being understood that the appended claims cover the use of one or more such polishers and the use of any desired number of polishers in cascade arrangement. Thus, polishers 25 and 26 would be described similarly to polisher 24 which is now described. In polisher 24, there is rotatable shaft 27 operated by motor 28. Shaft 27 is equipped at its wet carbon black receiving end with flight conveyor element 29 which extends substantially across the opening of transfer conduit 22 thus insuring positive feed or displacement of the wet black from the foot of transfer conduit 22 into and through polisher 24 to transfer conduit 30. Substantially the remainder of shaft 27 is equipped with polishing tines. As will be understood by one skilled in the art in possession of this disclosure and viewing the drawing, loose carbon black is wet pelleted and polished in smooth manner at a determined regular rate, there being no hold-up or balling-up or any other stoppage which can occur anywhere in the system thus insuring a more uniform product than heretofore obtained. Thus, the combination of element 12 with the remainder of mixer 8 and similarly the element 29 with the remainder of polisher 24 permits avoiding stoppages and further permits the use of measuring section 15 to permit an unusually smooth control of the entire operation.

*Example*

Carbon black at the rate of 1,000 pounds per hour and water at a rate of 1,000 pounds per hour were fed into the inlet end of wet mixer 8. Wet pellets were formed in the wet mixer, passed out of the outlet end of the wet mixer and onto weigh belt 16. The wet pellets passed from the weigh belt into the inlet end of first polisher 24, from the outlet end of the first polisher into the inlet end of second polisher 25, from the outlet end of the second polisher into the inlet end of third polisher 26 and from the third polisher into a drier. The wet mixer is ten feet and four inches long, and contains an axial shaft three and one-half inches in diameter. This shaft is provided with 115 one-half inch pins about one and one-half inches apart, inserted in the downstream end of the shaft forming a double helical pattern on the shaft. The tips of the pins rotate through a circle 14 inches in diameter. An auger about 14 inches in diameter is placed on the upstream end of the shaft. This auger extends across the inlet opening and adjacent the pins on the shaft. The water was sprayed into the mixer near the feed inlet. The shaft is operated at 1,750 r.p.m.

The wet pellets passed from the wet pelletizer onto weigh belt 16, which automatically adjusted the loose black feed rate, as earlier described. The rate of flow of water into the wet pelletizer was maintained at a constant rate. The weighing scales utilize a pneumatic transmitter to translate a variable weight into a pneumatic output signal which varies in proportion to the weight on the conveyor belt. This output signal is sent via a weight-recorder-controller to a Varitrol which regulates the speed of the loose black screw feeding the wet mixer. An output delay system retards the output signal to compensate for the time lag in the mixer.

The polishers are of substantially the same construction as the wet mixer, including the auger, shaft, and pin arrangement. The feed inlet to each polisher is 5 inches by 10 inches. The shafts in the polishers turn at the rate of 230 r.p.m.

The wet pellets, before entering the polishers, did not appear by visual observation, to contain water. There was very little change in the appearance of the pellets passing through the polishers, however, the density was increased about two pounds per cubic foot.

The rate of feed of carbon black to the wet mixer can vary, usually from 700 to 1,400 pounds per hour, and can be passed through the mixer. The ratio of carbon black to water is varied in accordance with the characteristics of the carbon black feed. The ratio of carbon black to water is usually varied from 42:58 to 58:42. By examining the pellets passing from the wet mixer, it can be determined how the ratio of carbon black to water should be varied to obtain the desired quality of wet pellets. The pellets should appear to the eye to be dry and there should be substantially no fines in the pelleted material.

Reasonable variation and modification are possible within the scope of the foregoing disclosure, drawing, and the appended claims to the invention, the essence of which is that in a carbon black wet mixer and/or polisher, a portion of the shaft, which is below the inlet end, is so constructed and arranged that there is positive or forced feed of the pellets into the wet mixer and/or polisher, and that an overall wet mixing and polishing method and apparatus have been provided wherein there is made advantageous use of a measuring section to determine the amount of wet mixed loose carbon black leaving the wet mixing step and to thus control the amount of loose carbon black fed to said wet mixing step and the amount of wet mixed carbon black fed to the polishing step, substantially as set forth and described herein.

I claim:

1. An apparatus especially suited for polishing carbon black pellets comprising in combination a plurality of substantially horizontally disposed carbon black pellet polishers, each essentially consisting of an elongated vessel having an axially disposed rotating shaft and each said shaft having a plurality of polishing tines thereon over a substantial length thereof, said vessels being disposed each at successive different levels, the topmost vessel having a feeding conduit adapted to feed to an end thereof loose, wet carbon black pellets to surround a portion of said shaft, said topmost vessel at its other end having a feeding conduit adapted to feed somewhat polished pellets to an end of a lower vessel to surround a portion of the shaft in said last vessel with pellets and auger-shaped continuous flight conveyor means on said pellets-surrounded shafts at the feed ends of said shafts to force said pellets horizontally and axially into said vessels.

2. An apparatus especially suited for polishing carbon black pellets comprising a wet mixing means for mixing loose carbon black and water, means for feeding loose carbon black and water to one end of said mixing means, an axially disposed substantially horizontal rotatable shaft in said mixing means, said shaft at a feed end of said means being equipped with auger-shaped continuous flight conveyor means for positively conveying into and through said mixing means an admixture of loose, wetted carbon black formed at said end, said shaft also comprising mixing elements along a substantial portion of the remainder thereof, wet carbon black mixture measuring means, means for passing wet carbon black from said mixing means to said measuring means, means upon said carbon black feeding means, upon said mixing means, adapted to control the flow of loose carbon black into said mixing means, means upon said carbon black measuring means adapted to control said means upon said loose carbon black feeding means to control the rate of flow of loose carbon black into said mixing means responsive to the amount of carbon black in said carbon black measuring means, means for discharging carbon black from said measuring means into means suited to the pelleting and polishing of carbon black comprising horizontally disposed carbon black polishing means, means for conveying loose, wet pellets to an end of said polishing means, and auger-shaped continuous flight conveyor means at said end of said polishing means to positively force the loose, wet pellets into said end of said polishing means in a direction toward the other end of said polishing means.

3. An apparatus especially suited for polishing carbon black pellets comprising a substantially horizontally disposed carbon black pellet polisher, essentially consisting of an elongated vessel having an axially disposed rotating shaft, said shaft having a plurality of polishing tines thereon over a substantial length thereof, said vessel having a feed receiving conduit adapted to feed to an end thereof loose, wet carbon black pellets to surround a portion of said shaft, said vessel at its other end having a conduit adapted to discharge wet pellets which have been polished, auger-shaped cnotinuous flight conveyor means on said pellets-surrounded shaft at said an end of said shaft to force pellets fed to said an end horizontally into said vessel; a wet mixer adapted to mix carbon black and water so as to form and to discharge wet pellets therefrom, said wet mixer being situated with respect to said polisher so as to discharge from said wet mixer the therein formed loose, wet carbon black pellets into said feed receiving conduit means and thus directly to the portion of said shaft which has said auger-shaped continuous flight conveyor thereon.

References Cited in the file of this patent
UNITED STATES PATENTS

| | | |
|---|---|---|
| Re. 21,379 | Glaxner | Mar. 5, 1940 |
| 675,163 | Overton | May 28, 1901 |
| 1,247,153 | Roberts | Nov. 20, 1917 |
| 1,786,556 | Arnold et al. | Dec. 30, 1930 |
| 2,131,686 | Heller et al. | Sept. 27, 1938 |
| 2,139,585 | Hunter | Dec. 6, 1938 |
| 2,205,814 | Forster | June 25, 1940 |
| 2,502,106 | Skoog et al. | Mar. 28, 1950 |
| 2,663,405 | Messing | Dec. 22, 1953 |
| 2,699,381 | King | Jan. 11, 1955 |